July 12, 1966   G. C. BARTON   3,260,144
TENSION RESPONSIVE FEED MEANS FOR DIE CUTTING PRESSES
Filed May 5, 1964   13 Sheets-Sheet 1

Fig.1

Inventor
George Clifford Barton
By his Attorney
George C. Fuller

Fig. 2

July 12, 1966 G. C. BARTON 3,260,144
TENSION RESPONSIVE FEED MEANS FOR DIE CUTTING PRESSES
Filed May 5, 1964 13 Sheets-Sheet 6

July 12, 1966   G. C. BARTON   3,260,144
TENSION RESPONSIVE FEED MEANS FOR DIE CUTTING PRESSES
Filed May 5, 1964   13 Sheets-Sheet 7

United States Patent Office 3,260,144
Patented July 12, 1966

3,260,144
TENSION RESPONSIVE FEED MEANS FOR
DIE CUTTING PRESSES
George C. Barton, Leicester, England, assignor to United
Shoe Machinery Corporation, Flemington, N.J., a corporation of New Jersey
Filed May 5, 1964, Ser. No. 365,056
4 Claims. (Cl. 83—203)

This invention relates to improvements in apparatus for progressively operating on sheet materials.

One of the objects of the present invention is to provide, in apparatus for operating on sheet materials, feeding means which will facilitate performance of the operation with improved efficiency.

Another object of the invention is to provide in such apparatus improved means for feeding sheet materials to a work station.

The features of the invention provided in accordance with the foregoing objects are illustrated in an embodiment hereinafter described in detail.

It will be understood that the particular machine embodying the invention is shown by way of illustration only and not as a limitation of the invention. The principles and features of this invention may be employed in varied and numerous embodiments without departing from the scope of the invention.

In general, the illustrative cutting press comprises upper and lower platens, the upper platen being mounted to move forwardly and rearwardly on a vertically reciprocable beam between a rearward position in which it leaves the work exposed on a cutting block on the lower platen for easy manipulation of a cutting die thereon, and a forward position in alignment with the lower platen, the press comprising two members under the control of the operator whereby he can, in setting up the press for a run of work, set first the length of stroke of the upper platen and then its limit of approach to the lower platen or alternatively first the said limit of approach and then the length of stroke.

Forward and rearward movement of the upper platen of this illustrative press is caused to take place by hydraulic means which imparts rotary motion to a composite shaft running the length of the platen and provided at each end with an arm which carries a roll constrained to ride in a steeply inclined channel in an adjacent side wall of the beam. Hydraulic means comprising a piston and cylinder at each end of the illustrative press is also provided for effecting vertical movement of the beam. The arrangement is such that upon actuation of a cycle of operation of the illustrative press after positioning a knife on the work (such actuation being effected by electrical means which requires both the operator's hands to be engaged at a safe distance from the cutting locality) the upper platen moves to its forward position, the beam descends, and then the beam and upper platen retract to their rest positions.

Dependent from the beam of the illustrative press are four links, two at each end, and at each end of the base frame of the press is a four-armed bell-crank lever pivoted on the base frame, the four arms being disposed in two parallel pairs, one pair of arms of each lever being coupled, by means of slidable blocks, to the two depending links at the adjacent end of the beam. The other pairs of arms of the bell-crank levers (one pair of which is upwardly inclined and the other downwardly), are interconnected by two inclined links. The arrangement is such as to ensure that the beam (and therefore the upper platen) remains substantially horizontal during its descent even through it may be unevenly loaded because it bears on a cutting knife which is nearer one end than the other of the cutting block.

The means of the illustrative press for determining the upper and lower limits of movement of the beam comprises two microswitches mounted on the base and arranged to be actuated by two rider blocks resting on a horizontally slidable cam bar linked to the front one of the aforementioned inclined links so that it moves endwise as the beam moves up and down. Actuation of the microswitches is dependent on the positions along the cam bar at which the rider blocks rest. The rider block that determines the lowermost position of the beam is adjustable by a lever arranged to be rocked by turning a knob of a rack and pinion mechanism. The other rider block can be adjusted by a second lever (which carries a binding screw) to which the block is connected by links. The two rider blocks are, however, coupled together by a parallel linkage which has the effect that while adjustment of said other rider block will not affect the position of the one that determines the lowermost position of the beam (thus enabling the stroke alone to be varied), turning the aforementioned knob moves both the blocks by substantially the same amount (thus adjusting the lowermost position of the beam without substantially altering the stroke).

The illustrative press is provided at the rear side with a bracket which supports material being fed toward the lower platen. Means is mounted on the bracket for gripping the material and feeding it forward, such means being operated by hydraulic power in response to the raising of a bar which overlies the material behind the cutting area. The arrangement is such that when the operator grasps the material and lifts it slightly to draw it forward, the bar is raised and the feeding means adjusted to grip the material and draw it from a roll or rolls on which it is supplied.

Other features and advantages of the invention will best be understood from the following description taken together with the accompanying drawings in which.

The illustrative press comprises a base frame 20 (FIGS. 1 and 2) with a flat horizontal top which comprise a lower platen 22 of the press and on which rests a cutting block 24 held in place by clamps 25. An upper platen 26 is mounted for horizontal forward and retracting movement into and out of alignment with the lower platen on a vertically reciprocable beam 28.

Figure 1:
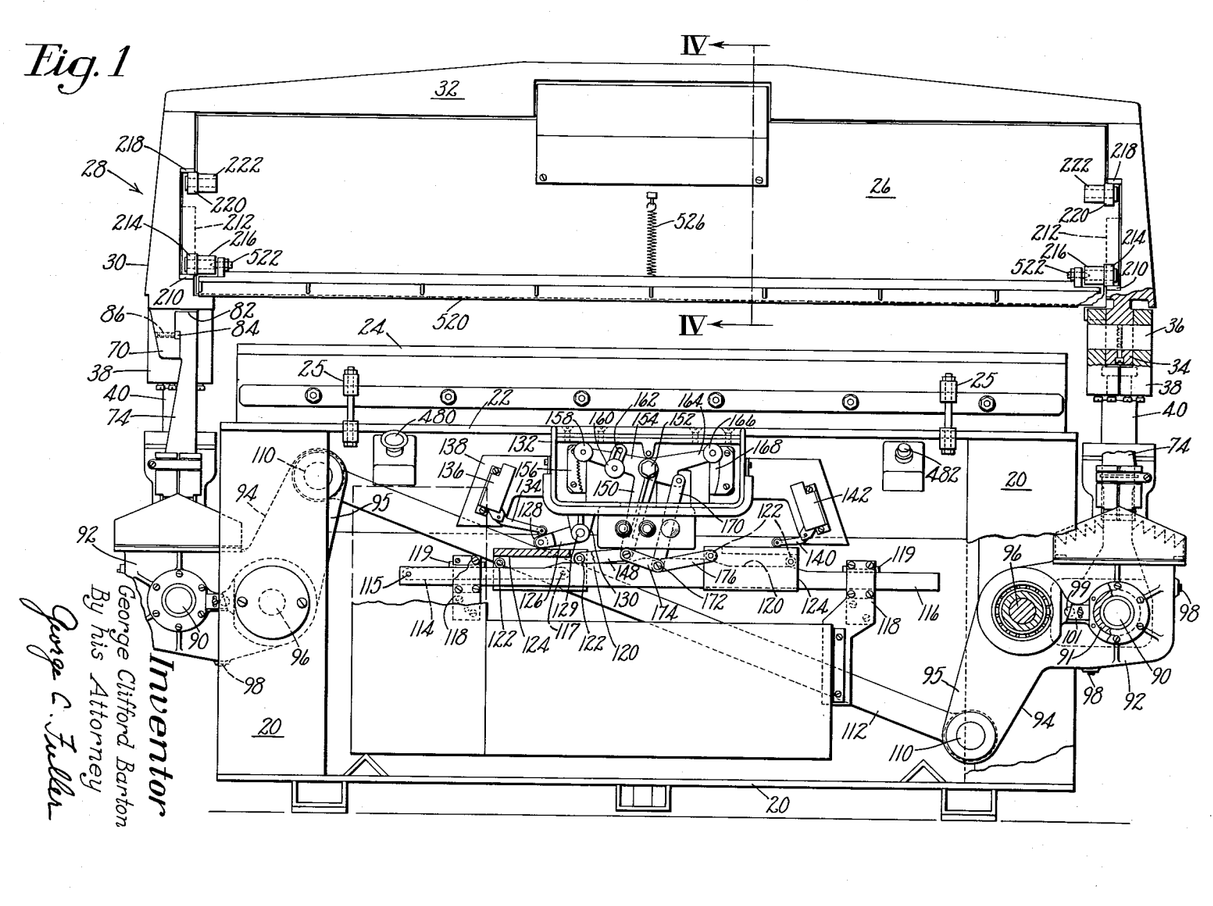
FIG. 1 is a view in front elevation and with parts broken away of the illustrative press.
Figure 2:
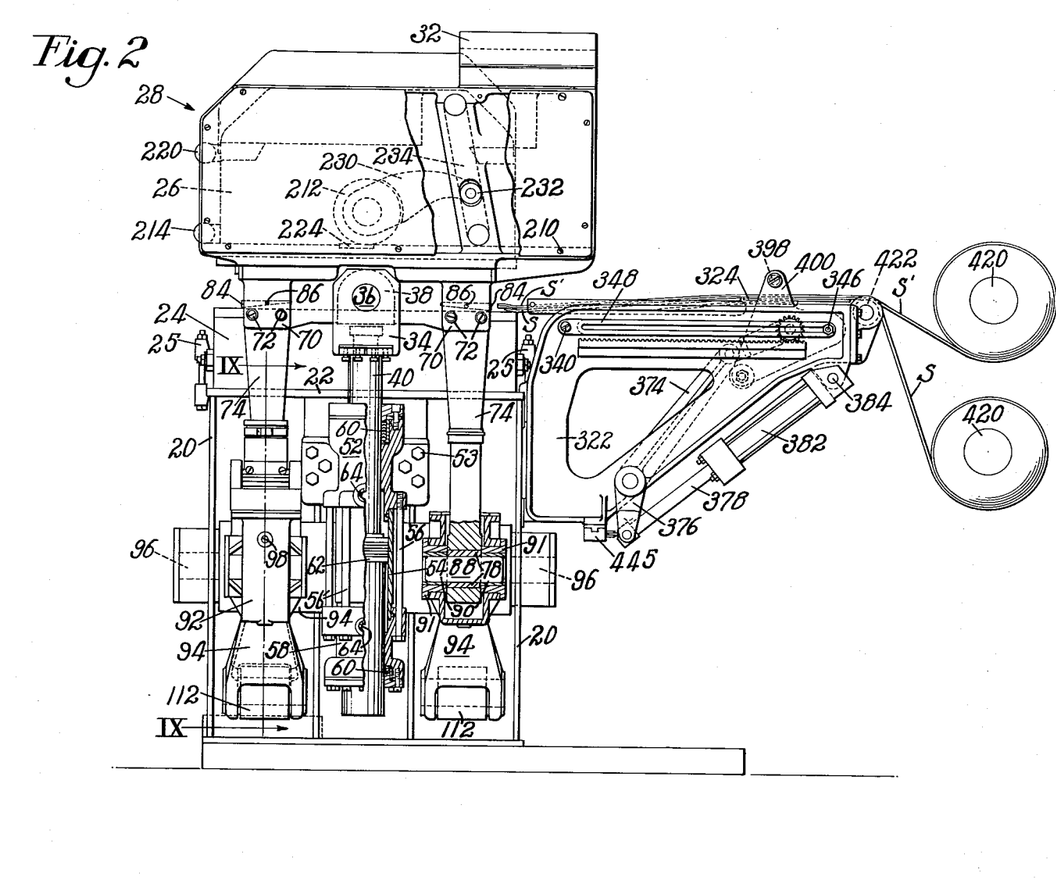
FIG. 2 is a view of the illustrative press with parts broken away in right-hand side elevation with an upper platen of the press in alignment with a lower platen.
Figure 3:
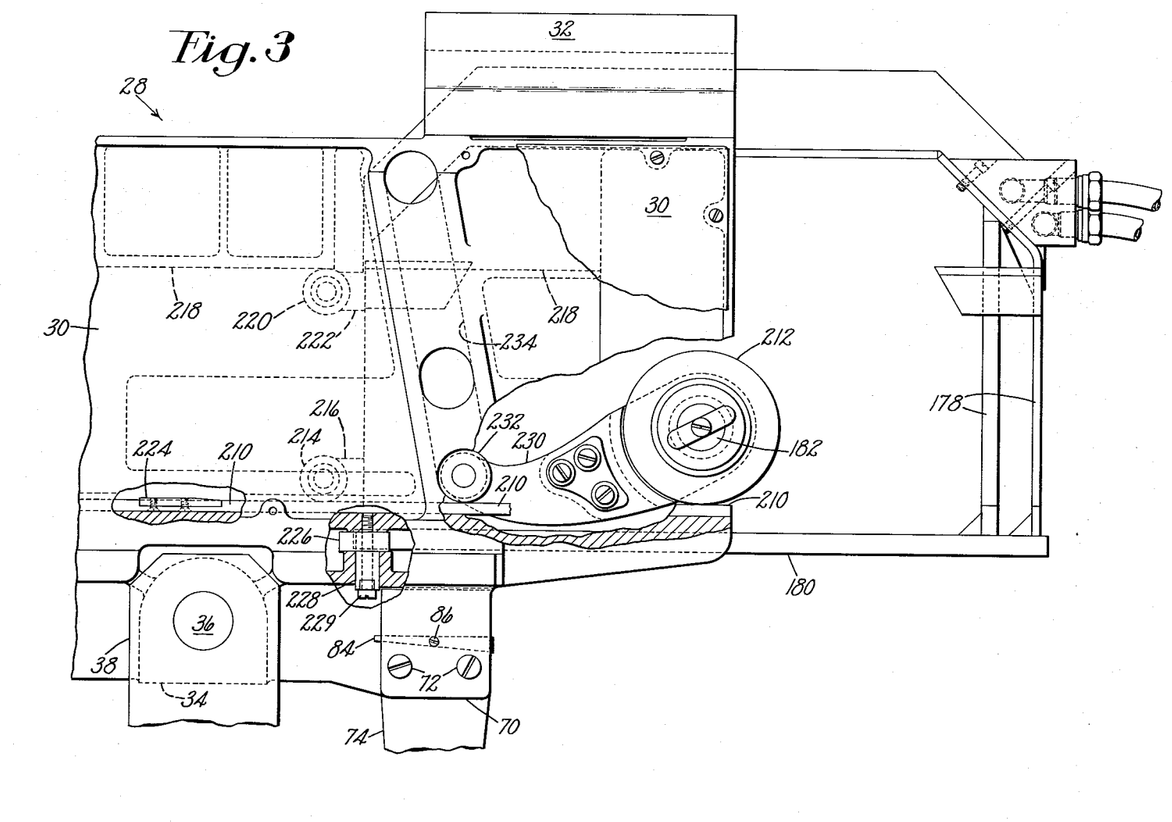
FIG. 3 is a view in right-hand side elevation and with parts broken away of an upper portion of the illustrative press with the upper platen in a retracted position which it occupies when the press is at rest.

The beam 28 of the illustrative press comprises cast metal side walls 30 (FIGS. 1 and 3) connected at the top by a bridge member 32 which spans the width of the upper platen. Each side wall 30 has a boss 34 (FIG. 3) pivoted at 36 to an upper end portion 38 of a vertical piston rod 40, there being two rods 40, one on each side of the press (FIG. 2). Each piston rod 40 slides in a bearing 52 bolted to the base frame 20, each bearing forming an upper end wall of a cylinder 54 clamped to the bearing 52 by tie rods 56 and a lower end wall 58. The bearings 52 and lower end walls 58 at each end of the illustrative press are provided with seals 60 which prevent escape of hydraulic fluid from the cylinders 54; pistons 62 on the rods 40 separate upper portions of the rods from lower, larger diameter, portions. The bearings 52 and end walls 60 are provided with ports 64 leading to the interior of the cylinders 54.

Figure 9:
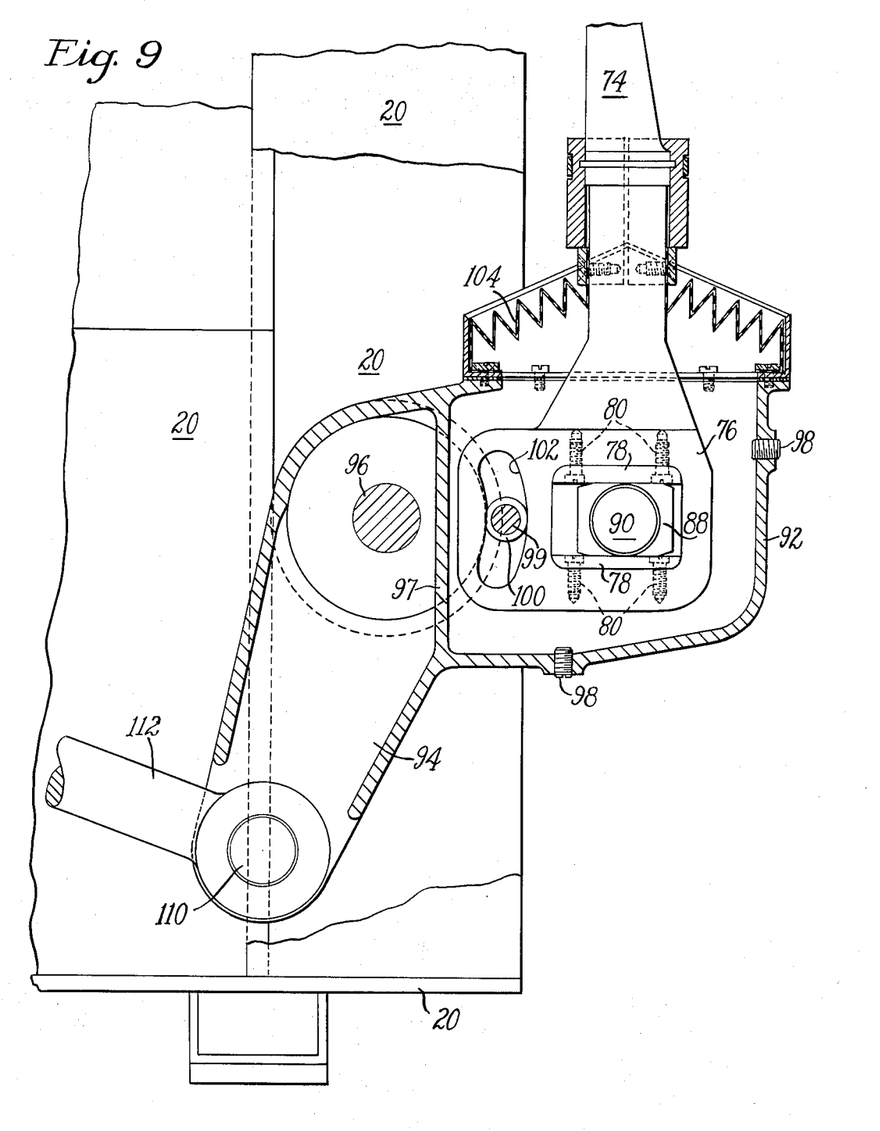
FIG. 9 is a fragmentary view largely in section on the line IX—IX of FIG. 2 and on a larger scale than FIG. 2.

Means for ensuring that the beam 28 of the illustrative press remains substantially level during its descent under the action of the piston rods 40 will now be described. At each end of the beam 28 two depending hook members 70 (FIGS. 1 and 2) are provided, the members 70 depending from the side walls 30, one in front of and one behind the boss 34. These members 70 have secured to them by bolts 72 upper end portions of links 74, the lower end portions 76 of which are apertured to receive upper and lower horizontal bearing pieces 78 (FIG. 9) secured by bolts 80. Flat upper ends of the links 74 bear against horizontal, downwardly facing, bearing surfaces 82 (FIG. 1) of the side walls 30 of the beam, and before the bolts 72 are tightened in assembling the illustrative press wedges 84 are inserted below inclined shoulders of the hook members to force the links up against the surfaces 82; the wedges are held in place by set screws 86.

Between the bearing pieces 78 on each of the links 74 is a horizontally slidable trunnion bushing 88 (FIG. 9) with cylindrical end portions 90 which project into bearings 91 provided in a hollow casing 92 which forms part of one of two parallel arms of a four-armed bell-crank lever 94 pivotally supported at 96 on the base frame 20, there being one such lever at each side of the illustrative press. Each casing 92, which is separated from the remainder of the bell-crank lever by a partition 97, has plugs 98 whereby oil can be admitted and drained, sufficient oil being kept in the casing to cover the end portion 90. A horizontal pin 99 (FIG. 9) supported by each casing carries a roller 100 which is accommodated in an arcuate slot 102 in the lower end portion 76 of the link 74 concentric with the pivot 96, so that, as the bell-crank lever swings about its pivotal support on the base frame, the lower end portion of the link 74 is constrained to move in a vertical, or substantially vertical, path during which it moves laterally with respect to the bushing 88. A flexible dust-proof cover 104 is provided which is sealed over the casing and to the link 74. One end portion of the pin 99 has a diametrical face which projects through the front of the casing 92 and is clamped by a wedge 101 (FIG. 1).

The other arms 95 of each of the bell-crank levers 94 of the illustrative press are coupled at 110 to one of two long parallel links 112 which extend, inclined, across the base of the press, thus interconnecting the two bell-crank levers 94. The arm 95 of one of the levers 94 projects downwardly from the associated shaft 96 and the other arm 95 upwardly from the other shaft (FIG. 1). The two ends of the beam 28 are thus linked together through the links 74, bell-crank levers 94, arms 95 and links 112 in such a manner that the beam is constrained to remain substantially horizontal as it moves up and down. It will be appreciated that the arrangement just described is of robust construction, restraint against the beam becoming substantially unlevel in the side-to-side direction being effected by the linkage interconnecting the two ends and restraint in the fore-and-aft direction being effected by the strength in torsion of the hub portions of the bell-crank levers 94.

The front one of the two links 112 of the illustrative press is connected by a link 114 by pins 115 and 117 to a horizontally slidable cam bar 116 mounted in brackets 118 secured to the base frame 20; keys 119 held in place by the brackets and bearing on flat upper surface portions of the bar ensure that it slides freely. The bar has two cam portions 120 on its upwardly facing surface and rollers 122 of two inverted U-shaped rider blocks 124 rest on this surface. Movement of the cam bar 116 to the left (FIG. 1) takes place as the beam 28 descends in the operation of the illustrative press and causes the left-hand rider block 124 to be lifted. A lever 126 provided with a roll 128 which rests on the top of the block is secured to a horizontal forwardly and rearwardly extending shaft 129 pivoted on a lug 130 depending from a housing 132 fixed to the base frame 20 below the lower platen 22. A detector arm 134 of a microswitch 136 mounted on a bracket 138 projecting from the housing 132 rests on the roll 128 so that the microswitch is actuated in response to lifting of the block 124 and thereby terminates the downstroke of the beam and initiation of the upstroke, as will be fully described hereinafter. Similarly, movement of the cam bar 116 to the right, which takes place on upward movement of the beam 28, results in the right-hand rider block 124 being lifted (to the position shown in FIG. 1) to actuate, through a detector arm 140 resting on the block, a microswitch 142 which effects termination of the upstroke of the beam.

The lowermost and uppermost positions assumed by the beam 28 in the operation of the illustrative press can be adjusted by changing the positions of the blocks 124 along the bar 116. Thus the left-hand block 124 is connected by a link 148 (FIG. 1) to a depending arm 150 of a bell-crank lever 154 pivoted at 152 on the housing 132. A second arm of the lever 154 carries a rotatable pinion (not shown) in mesh with a gear sector 156, the pinion having a knob 158 exposed at the front of the press by which the pinion can be turned to swing the lever and adjust the position of the left-hand block 124 along the cam bar 116. A binding screw 160 which passes through an arcuate slot 162 in the lever and into a tapped hole in the housing enables the lever 154 to be clamped in adjusted position. A second lever 164 also pivoted at 152 carries a binding screw 166 riding in an arcuate slot 168 in the housing by means of which the lever can be clamped in adjusted position about the pivot 152. A link 170 pivoted to the lever 164 is connected to an elbow formed by a pin 172 on which are also pivoted a link 174 connected to the arm 150 of the bell-crank lever 154 and a link 176 connected to the right-hand rider block 124. Adjustment of the lever 164 can thus change the position of the right-hand rider block 124 along the cam bar and therefore the uppermost position assumed by the beam in the operation of the illustrative press. This adjustment, however, is not entirely independent of the adjustment of the left-hand block for the reason that the links 170 and 174, the arm 150 of the lever 154 and part of the lever 164 form a closed linked figure that confines adjustment of the uppermost position of the beam to a range of positions relative to the lowermost position as permitted by the articulation of the links at the elbow formed by the pin 172. Maximum and minimum heightwise movements are thus imposed on the beam though these can take place over a wide range of heights relative to the lower platen. Furthermore, the arrangements just described enable the stroke to be varied without affecting the lowermost position of the beam and the lowermost position of the beam to be adjusted without substantially altering the stroke. Thus, in setting up the illustrative press for a run of work, the operator may determine first the lowermost position of the beam and thereafter the stroke or alternatively determine first the stroke and thereafter the lowermost position of the beam.

Figure 4:
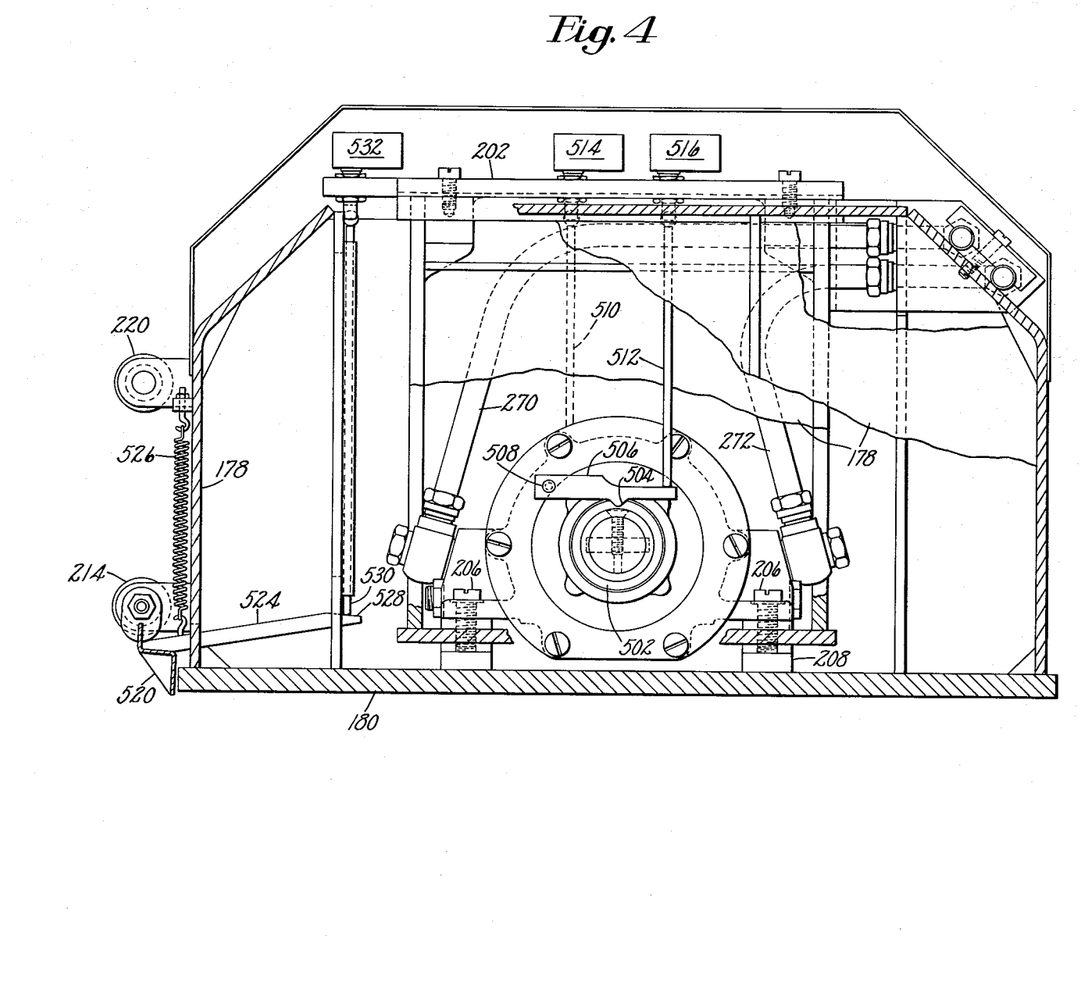
FIG. 4 is a view with parts broken away and largely in section in the line IV—IV of FIG. 1 of the upper platen of the illustrative press.
Figure 5:
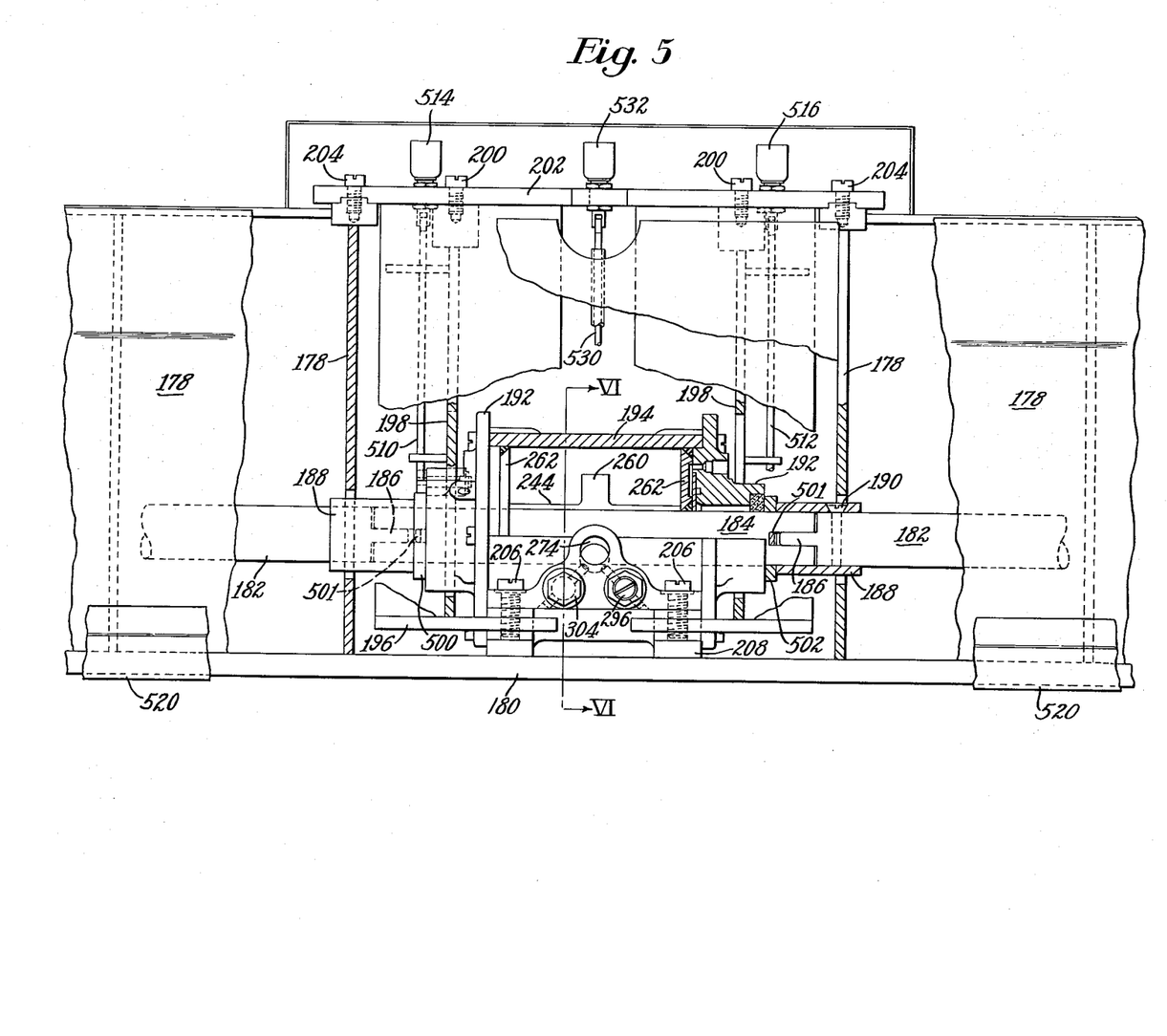
FIG. 5 is a view in front elevation with parts broken away and largely in section of a central portion of the upper platen of the illustrative press showing hydraulic means for effecting forward and rearward movement of the platen.

The upper platen 26 of the illustrative press comprises a fabricated framework 178 of which a plate 180 (FIGS. 3, 4 and 5) constitutes the bottom. The framework supports two horizontal coaxial shafts 182 (FIG. 5) extending widthwise of the press and joined together in the middle by a short interconnecting shaft 184. Keys 186 on the shafts 182 project into slots in the ends of the shaft 184 so that rotary motion can be imparted from one to another, the shaft 184 being held in axial alignment with the others by sleeves 188 around the keys and secured to the shafts 182 by screws 190 (only one of which is seen in FIG. 5). The key slots in the shaft 184 are parallel to enable the shaft to be assembled or withdrawn laterally after sliding the sleeves 188 along the shafts 182. The shaft 184 is supported by bearings 192 provided by end portions of a cylinder 194 mounted on a platform 196 (FIG. 5) provided by a bracket 198 bolted at 200 to a bridge 202 secured by bolts 204 to the framework of the platen. Screws 206 by which the cylinder 194 is secured to the platform engage pads 208 on the upper surface of the bottom plate 180 of the platen.

The platen 26 of the illustrative press is capable of forward and rearward movement along straight bearing tracks 210 (FIGS. 1 and 3) formed on the side walls 30 of the beam 28. Two wheels 212 are freely mounted, one on each shaft 182, to ride on the tracks, and rollers 214 (one at each end of the platen and mounted on brackets 216 projecting forwardly therefrom) assist the platen's movement. An overhanging shoulder 218 of each side wall 30 of the beam overlies marginal end portions of the platen 26 and can be engaged by an upper roller 220 (FIGS. 1 and 2) carried by a forwardly projecting bracket 222 at each end of the platen. The rollers 214, 220 restrain rocking of the platen 26 on the wheels 212 but run off the side walls 30 of the beam when the platen is in a forward position (FIG. 2). On reaching such forward position, the wheels 212 ride on to wedgeshaped cams 224 (FIG. 3) forming part of the tracks 210 with the result that the platen 26 becomes firmly wedged against the overhanging shoulders 218 of the beam. End faces of the bottom plate 180 of the platen 26 engage rollers 226 mounted on eccentric upper end portions of vertically disposed sleeves 228 secured to the side walls 30 of the beam by bolts 229. Rotation of the sleeves 228 permits fine adjustment of the spacing between the rollers 226, at opposite ends of the beam, to enable the rollers to assist the guiding of the platen along a straight forward and rearward path.

Rotational movement of the shafts 182 causes the upper platen 26 of the illustrative press to move forwardly and rearwardly on the beam 28. Each shaft 182 has fixed to it at the end of the platen a rocking arm 230 (FIGS. 2 and 3) which carries a roll 232 constrained to ride in a steeply inclined channel 234 on the adjacent inner end face of the side wall 30 of the beam. Swinging of the arms 230 clockwise from the position shown in FIG. 3 to that shown in FIG. 2 thus causes the platen to run from a rearward retracted position to a forward one in alignment with the lower platen 22.

The composite shaft (composed of the shafts 182, 182, 184) is caused to rotate in the operation of the illustrative press by hydraulic means comprising the cylinder 194 within which are accommodated two vanes 240, 241 (FIG. 6) bridging an annular chamber 243 formed by the shaft 184 and the inside of the cylinder. Each vane is clamped by screws 242 between faces of two metal castings 244, one pair of castings clamping the vane 240 and being bolted to the cylinder by screws 246 and the other pair clamping the vane 241 and being bolted to the shaft by screws 248. One of the castings of each pair has a rectangular projection 250 that abuts a radial face 252 of the other casting to leave an annular space around the projection which is connected by a passage 254 to a valve chamber 256 (FIG. 7) within which is seated a ball 257 free to block one or other of two outlets 258 leading to the chamber 243 at one side or the other of the vane. Thus, hydraulic fluid admitted under pressure to the cylinder 194 at either side of the vanes 240, 241 can find its way through one of the outlets 258 associated with each vane to the valve chambers 256 and thence through the passages 254 to the spaces around the projections 250 and thereby urge the vanes against the walls of the cylinder and against the shaft 184 to ensure effective seals. The castings 244 are formed with sector-shaped central webs 260 which abut corresponding webs of the castings of the other pair to limit the rotation of the shaft to 130°.

End walls of the chamber 243 are formed by annular plates 262 (see FIG. 7) between which and the bearings 192 are provided sealing gaskets 264. (Rollers of the bearings 194 are not shown in the drawings.)

Figure 6:
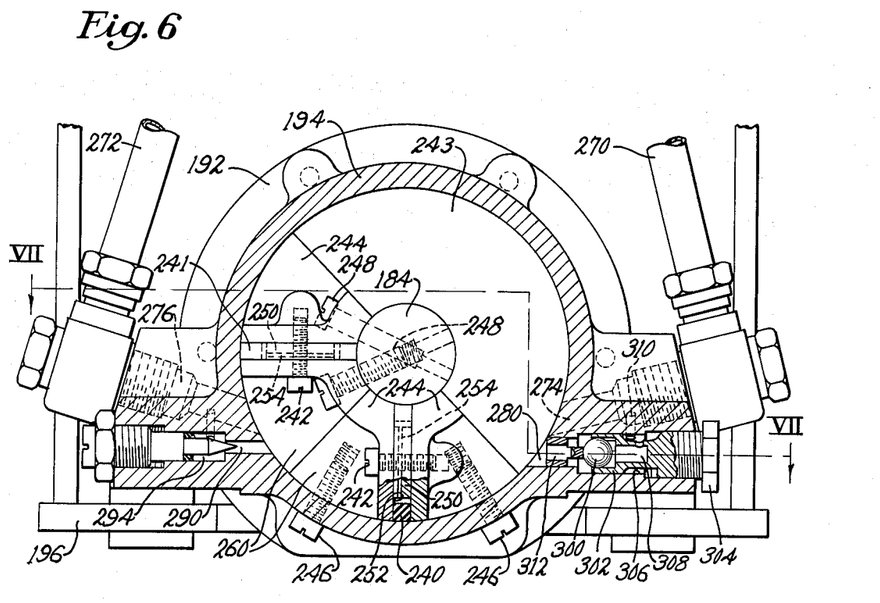
FIG. 6 is a view largely in section on the line VI—VI of FIG. 5 of the hydraulic means shown in FIG. 5.

Hydraulic fluid under pressure is admitted to and exhausted from the cylinder 194 on one side or the other of the fixed vane 240 (i.e. the vane clamped by the pair of castings secured to the cylinder) through pipes 270, 272 (FIGS. 4 and 6), the pipe 270 leading to a passage 274 in front of the vane 240 (i.e. on the right of the vane viewing FIG. 6) and the pipe 272 to a passage 276 behind it. The passages 274, 276 enter directly into the chamber through relatively large bores which are closed by the web 260 of one or other of the castings 244 of the pair secured to the shaft 164 when the shaft is at one end or the other of its rotation of 130°; as shown in FIG. 6, the passage 276 is thus closed. At either side of the passage 274, however, (and at either side of the web 260 when the passage is closed) bores 280, 282 (FIG. 7) lead from the chamber 243 to valve chambers 284, 286 respectively; similarly disposed bores 288, 290 at either side of the passage 276 lead to valve chambers 292, 294 respectively. The bores 282, 290 are smaller than the bores 280, 288, which are themselves smaller than the passages 274, 276.

Within each valve chamber 282, 294 is a needle valve 296 threaded at one end and adjustably secured in a tapped bore by means of a lock nut 298. Within each chamber 280, 292 is a ball 300 slidable axially of the chamber in a cavity defined by three axially projecting fingers 302 of a stud 304 which are disposed adjacent the chamber wall. The stud 304 is screwed into a tapped bore which provides, around a necked portion of the stud, an annular chamber 306. Holes 308 lead from said cavity to the annular chamber 306 and a bore 310 (FIG. 6) from the chamber 306 to the respective one of the passages 274, 276. Each of the bores 280, 288 has pressfitted therein an apertured plug 312 (FIG. 6) with a central bore positioned to arrest the ball 300 when it rolls toward the chamber 243, the ball, when thus arrested, allowing hydraulic fluid to flow from the respective pipe 270, 272 into the cylinder 194. Fluid attempting to flow in the opposite direction, however, is prevented by the ball which seats itself on the stud 304 blocking the hole 308 (FIG. 6). The valve chambers 286, 294 are also connected to the respective one of the passages 274, 276 by bores 314.

Hydraulic fluid passing under pressure through the pipe 270 into the passage 274 when the illustrative press is at rest with the platen 26 in its retracted position is able to pass into the chamber 243 below the vane 241 through the bores 310, 280, causing the vane to turn the composite shaft 182, 182, 184 through 130° to bring the platen to its forward position. During such turning of the shaft hydraulic fluid is exhausted from the chamber 243 through the passage 276 and bore 290, but as the platen approaches its forward position, the leading one of the webs 260 closes the opening of the passage 276 and the fluid is allowed to escape only past the needle valve 296; the platen is thus slowed down so that it can be brought to rest at its forward position without undue shock. Retraction of the platen takes place similarly with the fluid entering the chamber by way of the pipe 272 and exhausting through the pipe 270.

Figure 10:
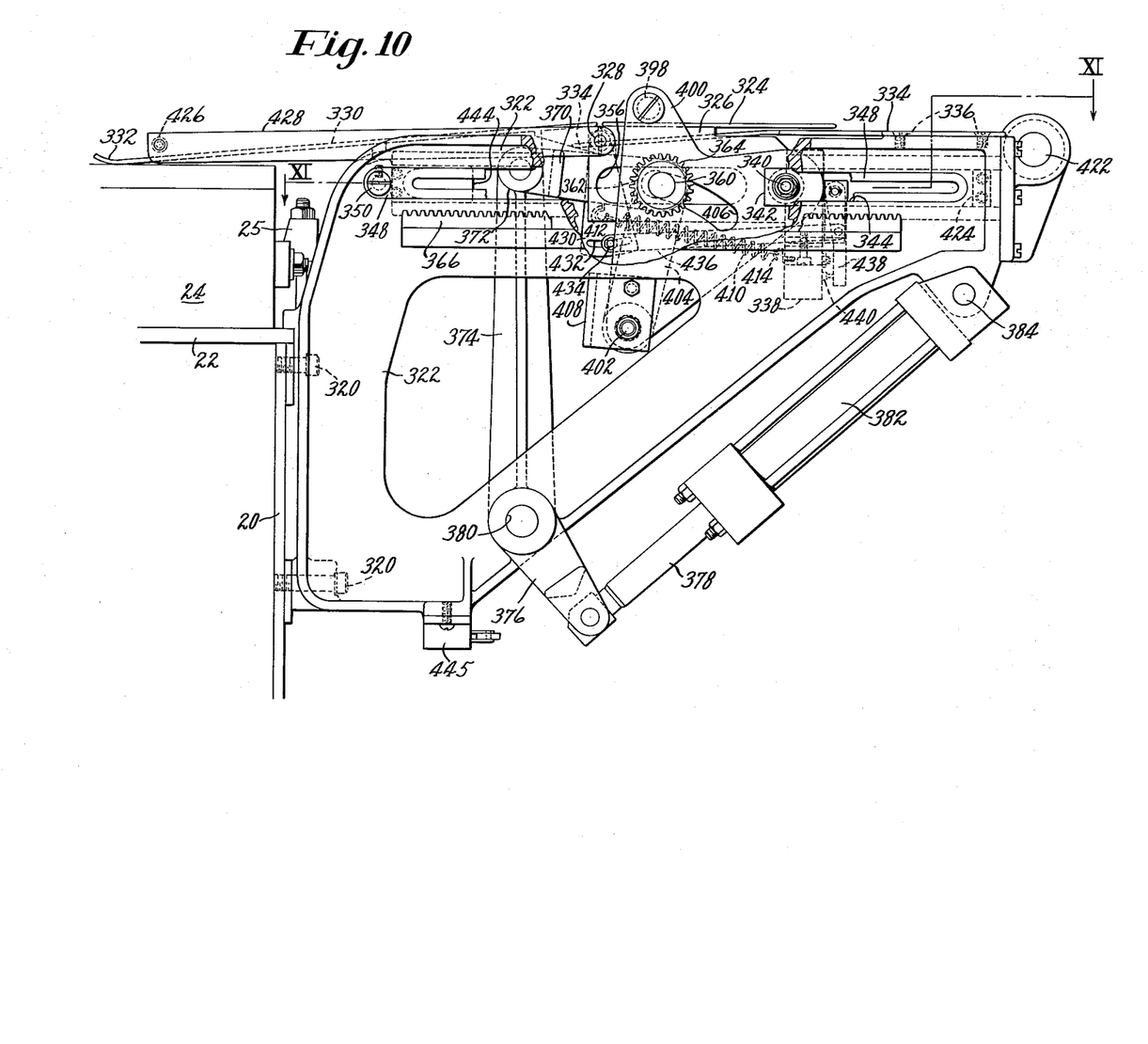
FIG. 10 is a view in right-hand side elevation and partly in section of a rear portion of the illustrative press showing means for assisting the forward feeding of sheet material drawn from rolls.
Figure 11:
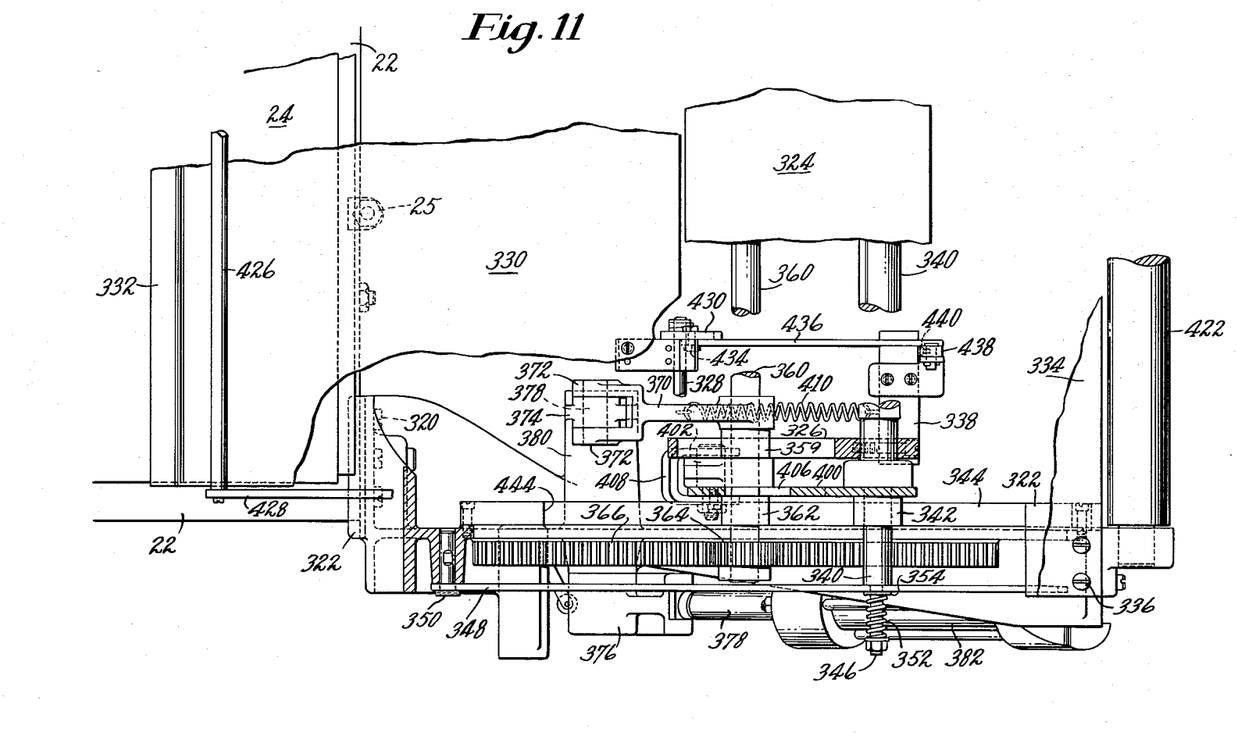
FIG. 11 is a view in plan with parts broken away of mechanism shown in FIG. 10.

The web feeding means will now be described. To the back of the base frame 20 of the illustrative press there is secured by bolts 320 a bracket 322 (FIGS. 2, 10 and 11). A flat horizontal narrow plate 324 is mounted over the top of the bracket, the plate 324 extending substantially across the width of the press a short distance behind the frame 20 and a little above the level of the top of the block 24. The plate 324 is secured to two blocks 326 (one only visible in FIG. 10). Just below the front edge of this plate extends, at each end, a short shaft 328 mounted to rotate in the blocks 326. On these shafts 328 is freely pivoted a broad plate 330 which extends the length of the plate 324 from the front edge of the plate 324 to the top of the cutting block 24 on which it rests. The plate 330 is thus slightly inclined forwardly and is curved upwardly along its front edge 332. A cover 334 underlies the plate 324 and extends to the rear edge of the bracket 322 to which it is fixed by screws 336.

The two blocks 326 which carry the plates 324, 330 are mounted to move forwardly and rearwardly of the bracket 322 of the illustrative press. To a rearward face of each block 326 is bolted a depending L-shaped member 338, semicircular recesses in the block and member serving to clamp a shaft 340 which extends across the width of the bracket 322 and carries at each end a slidable bearing block 342 arranged to ride along an adjacent horizontal track 344 provided by the bracket. Reduced end portions 346 of the shaft 340 pass through horizontal longitudinal guideways 348 (see also FIG. 2) secured at their forward ends by bolts 350 to the bracket. Compression springs 352 captive on the portions 346 of the shaft urge washers 354 against the guideways 348 to provide frictional resistance to movement of the blocks 342 along the track 344.

Passing through aligned horizontal slots 346 in the blocks 326 in front of the shaft 340 is a parallel shaft 360 also provided with slidable bearing blocks 362 which ride on the tracks 344. Within the slots 356, the shaft 360 is borne by bearing blocks 359 slidable along the slots. At each end, the shaft 360 carries, fixed thereto, a pinion 364 which runs on a horizontal rack 366. The shaft 360 rotates freely in two links 370 (one near each end inside blocks 326), each coupled at 372 to an upper end portion of an upwardly projecting arm of one of two bell-crank levers 374, 376 mounted in bearings 380 provided by the bracket 322. Depending second arms 376 of the bell-crank levers are pivoted to piston rod 378 of two pistons (not shown) mounted in cylinders 382, the cylinders (one only visible in the drawings) being pivoted at rearward ends of the brackets 322 at 384. Fluid under pressure admitted to the cylinders 382 below the pistons causes the rods 378 to retract and the bell-crank levers 374, 376 to rock from their positions indicated in FIG. 2 to their positions indicated in FIG. 10 (one only of the bell-crank levers being visible in the drawings) the shaft 360 being thus drawn forwardly by the links 370 while its parallelism with the press is maintained by the racks and pinions 364, 366.

Across the top of the plate 324 of the illustrative press is disposed a rod 398 secured at each end to a portion of a generally triangularly-shaped lever 400 (FIGS. 2 and 10), which projects above the level of the plate. The levers 400 are freely mounted on the shaft 340. Below and in front of the shaft 340 the levers 400 are pivoted at 402 (by means of a shackle 408) to links 404 freely dependent from the shaft 360. The shaft 360 passes through an arcuate cam slot 406 in each of the levers 400. Tension springs 410 (only one shown in the drawings) extend between hooks 412 on the links 370 and hooks 414 on the members 338.

The illustrative press may be used for cutting more than one sheet of material at a time, and in FIG. 2 the press is shown as operating on a web of two sheets S and S' drawn from rolls 420 supported independently of the press (by means not shown). From the rolls, the sheets S, S' are drawn over a guide roll 422 supported at the rearward end of the bracket 322 and over the plates 324, 320 onto the cutting block 24, the sheets passing under the rod 398.

In the operation of the illustrative press, the drawing of the sheets from the rolls is effected under power upon admission of fluid under pressure to the cylinders 382 below the pistons. Thus, viewing FIGS. 2 and 10, consequent rocking of the bell-crank levers 374, 376 causes the shaft 360 to be pulled forwardly or to the left, as viewed in FIG. 2. This is due to restraint to forward movement of the blocks 326 afforded by the friction between the washers 354 and bars 348, the shafts 340 holding the levers 400 from moving bodily forward until they have swung about the axis of the shaft 340, this being due to the shaft 360 bearing against the lower edges of the slots 406, and bringing the rod 398 down onto the top of the sheet S'. The rod 398 thus clamps the sheets upon the plate 324, whereupon the force exerted by the shaft 360 on the aforementioned lower edges of the slots 406 causes the levers to be pushed forwardly bringing the blocks 326, and therefore the plates 324, 330 with them. The effect of the return strokes of the pistons in the cylinders 382 is to cause the link 370 to push the shaft 360 rearwardly with the initial result that the shaft, acting against the upper edges of the slots 406, swings the levers 400 upwardly about the axis of the shaft 340 lifting the rod 398 off the work (rearward movement of the blocks 326 being meanwhile restrained by the frictional resistance of the washers 354 on the bars 348). However, when the shaft reaches the rearward ends of the slots 406 it pushes the levers and the blocks 326 (and therefore the plates 324, 330 which slide under the sheet S) backwards until the bearing blocks 342 engage abutments 424 at the rear ends of the tracks 344.

Forward movement of the plates 324, 350 to feed the sheets S, S' in the operation of the illustrative press is initiated by the raising of a rod 426 which overlies the sheets S, S' and is carried by forwardly projecting arms 428 secured to the shafts 328 (FIGS. 10 and 11). At the left-hand end of the right-hand one of these shafts depends an arm 430 having an arcuate slot 432 in it in which is an adjustable bolt and pivot pin 434. A link 436 extends from this pin to a depending arm 438 pivoted to the L-shaped member 338. Lifting of the rod 426 causes the arm 438 to swing clockwise (viewing FIG. 10) whereby to depress a button of a microswitch 440 (see also FIG. 13). Closing of the switch 440 by depression of the button actuates a relay G/2 which closes two contacts G1 and G2. The closing of contact G1 energizes a solenoid valve V4 (see also FIG. 13) to allow fluid under pressure to enter the cylinders 382 below the pistons. The closing of contact G2 closes a spring-return solenoid valve V5 through which fluid could alternatively flow to the reservoir as hereinafter described. As soon as the plates 324, 333 begin to move forward, the arm 376 rocks away from a microswitch 445 which closes to hold the valve V5 energized until the plates fully retract again. Lowering of the rod 426 de-energizes the solenoid valve V4 which returns under spring pressure to allow the fluid to be exhausted from the cylinders below the piston and admitted above. Thus, release of the rod terminates forward movement of the plates 324, 330 and brings about their return to their rearward positions. Forward movement of the block 326 is otherwise limited by engagement of the bearing blocks 362 with abutments 444 at the forward ends of the tracks 344.

Raising and lowering of the rod 426 takes place, when the illustrative press is in use, as a result of the tensioning and release of the material on which it rests. Thus, when the operator grasps the material and begins to draw it forward, the rod 426 is raised and the rod 398 and plate 324 grip the material and feed it forward, but the grip is released and the rod 398 and plate 324 retract as soon as the tension in the material under the rod 426 slackens and allows the rod to fall. The feed of the material under power thus takes place in response to the operator's own effort to draw the material over the cutting block.

Figure 13:
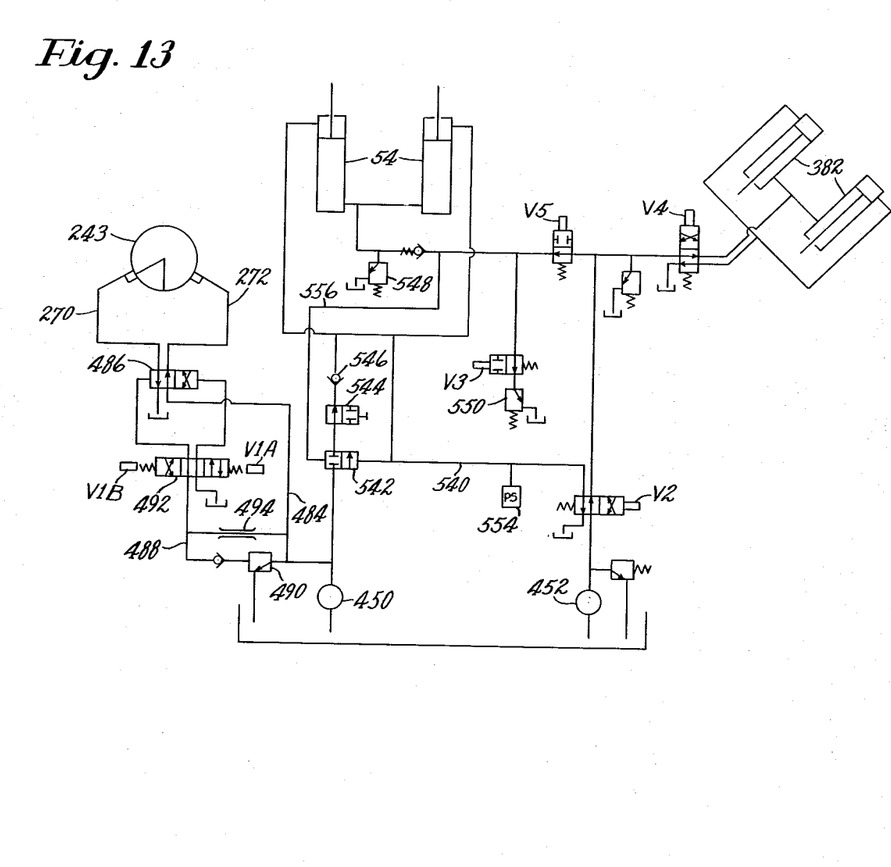
FIG. 13 is a diagram depicting hydraulic means of the illustrative press.
Figure 14:
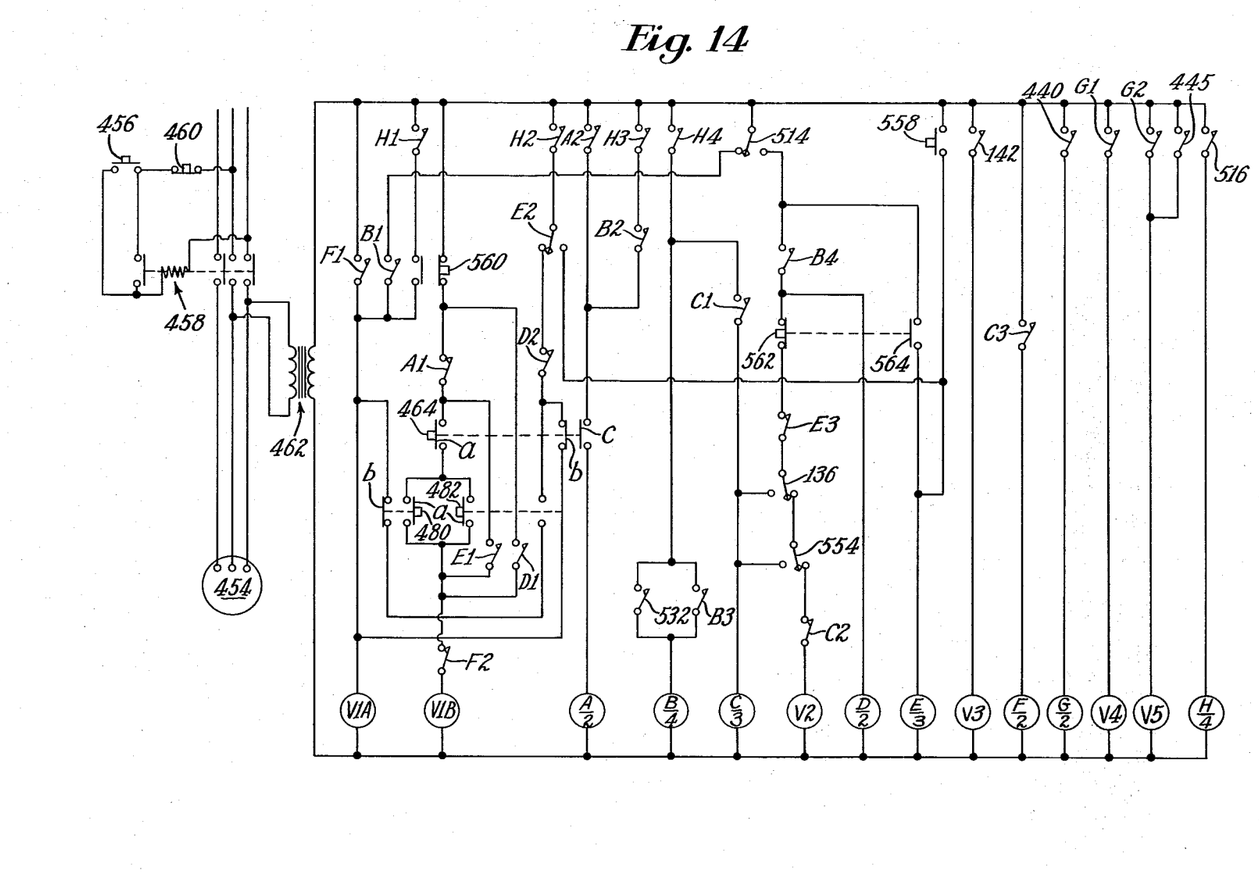
FIG. 14 is a diagram of electrical controlling means of the illustrative press.

Referring now more fully to FIGS. 13 and 14, a high capacity, low pressure, hydraulic pump 450 and a low capacity, high pressure, pump 452 (FIG. 13) are driven continuously by an electric motor 454 (FIG. 14) actuated by a start button 456 and thereafter held energized by a relay 458 until de-energized by a stop button 460. The relay 458 also holds energized a transformer 462 and control circuits of the illustrative press.

A cycle of operation of the illustrative press will now be described, assuming that the work has been fed forward and a cutting die positioned on it over the cutting block, and that the upper piston 26 is in its rearward position. The operator now actuates two of three switches so positioned as to necessitate his using both hands and thus ensuring that neither hand will be near the cutting locality or in the path of movement of the upper piston. One of these switches, indicated at 462 in FIG. 12, has an upstanding lever 464 which is rocked (anticlockwise viewing FIG. 12) by the operator depressing a plate 466 pivoted at 468 centrally at the front of the illustrative press. A depending arm 460 of the plate, which engages the button, is urged forwardly by a spring-pressed plunger 472 to restore the plate to an uppermost position (in which the arm engages a wall of the housing 132) when the plate is released. Rocking of the lever 464 on depression of the plate closes contacts 464a and 464c (FIG. 14) and opens a contact 464b. With the other hand, the operator presses one of two buttons 480, 482 situated at either side of the plate 462. These buttons close contacts 480a, 482a respectively and open contacts 480b and 482b. The contacts 480a, 482a are in parallel with one another and in series with the contact 464a, closing of both 464a and one of the contacts 480a and 482a resulting in energizing of a solenoid V1B.

Figure 12:
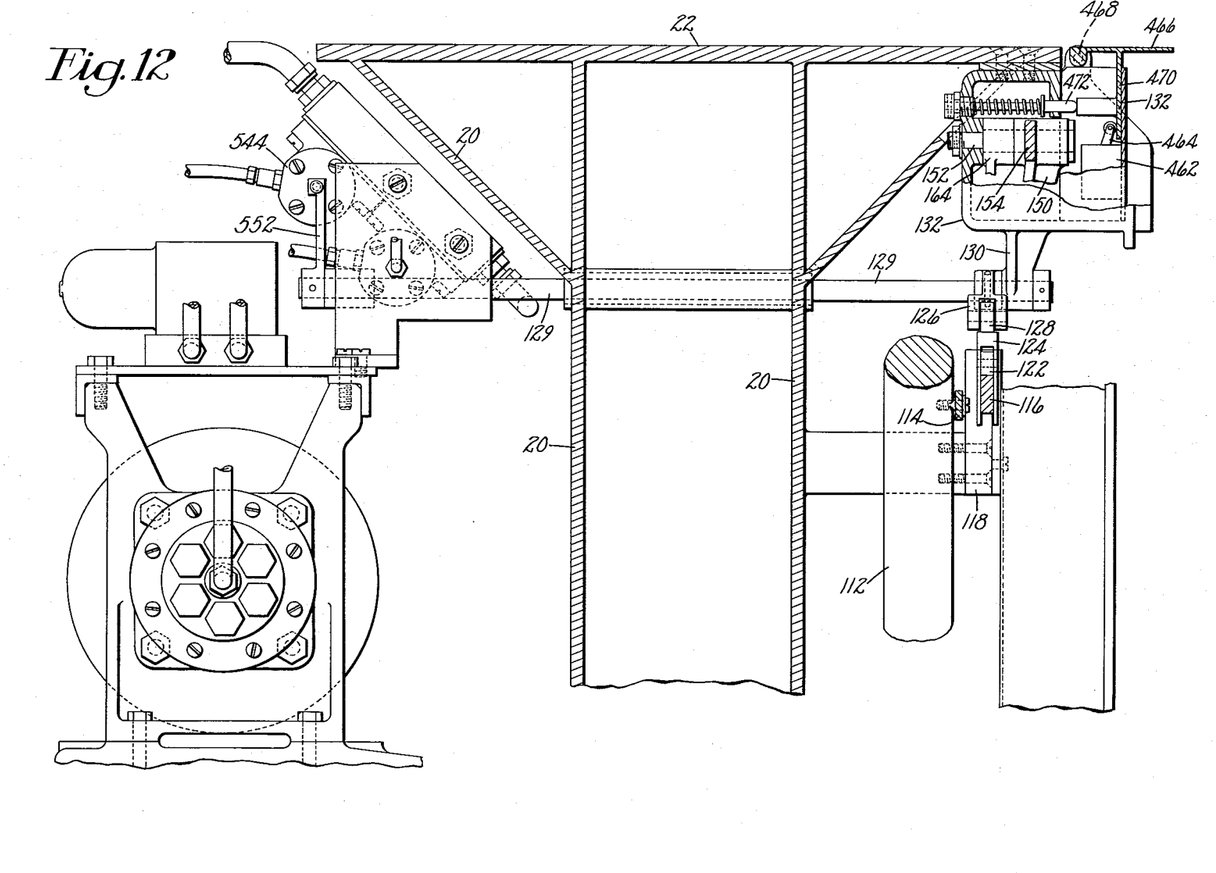
FIG. 12 is a view in left hand side elevation and partly in section of part of the illustrative press.

Turning now to the hydraulic circuit shown in FIG. 13, from the low pressure pump 450 fluid flows through a pipe 484 and a pressure-controlled valve 486 through the pipe 272 to the chamber 243. In a branch pipe 488 leading from the pipe 484 in a relief valve 490 of a type that allows fluid to pass to the reservoir at low pressure (e.g. 60 lbs. per square inch) when the branch 488 is exhausted (as it is when a three position valve 492 is in a centralized position as indicated in FIG. 12), but which, if pressure is allowed to build up in the branch pipe 488 due to the valve 492 being set in one of its other positions, will resist flow of fluid at low pressure and maintain an adjustable pressure of approximately 200 lbs. per square inch in the pipe 484. A flow restrictor 494 is arranged in parallel with the valve 490.

Figure 7:
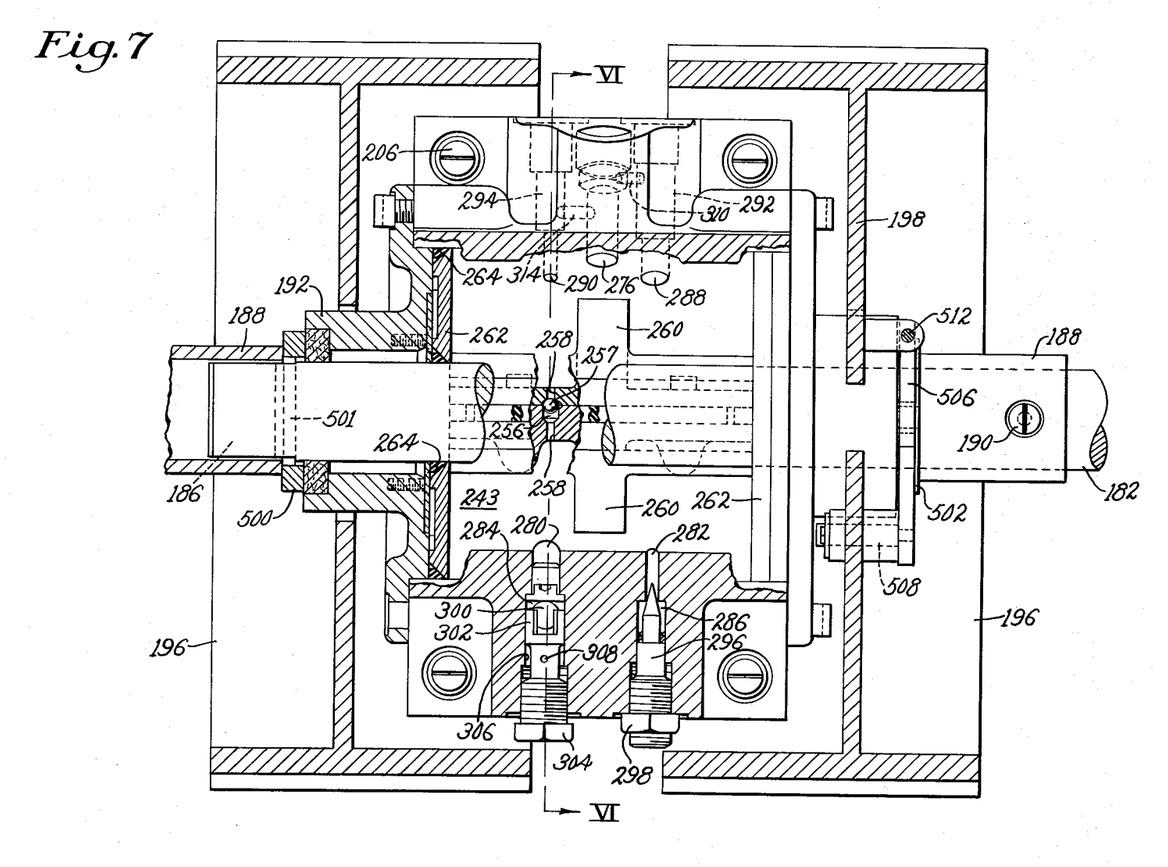
FIG. 7 is a plan view of the hydraulic means of FIG. 5 largely in section on the line VII—VII of FIG. 6.
Figure 8:
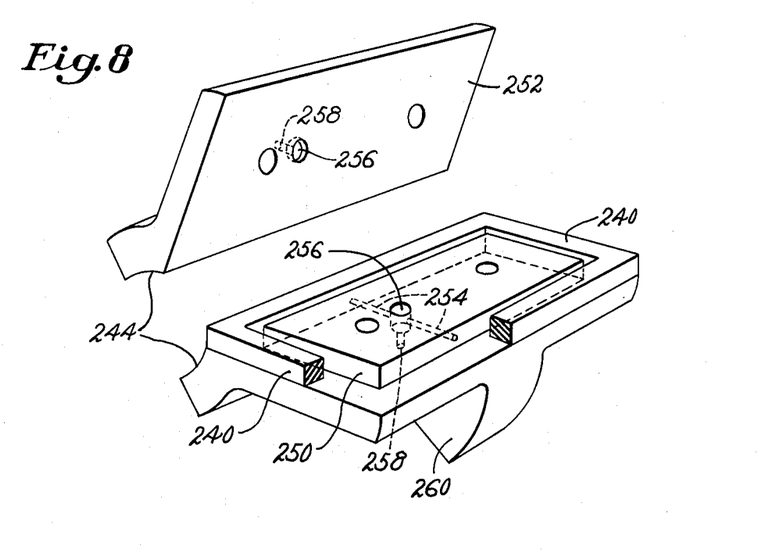
FIG. 8 is an exploded perspective view of mechanism shown in FIG. 7.

The valve 492 is set in one of such other positions by the energizing of one of two solenoids V1A and V1B, the valve being centralized by springs when both solenoids are de-energized. Energizing of solenoid V1B moves the valve 492 to the right (as depicted in FIG. 13) to allow fluid to flow to the right-hand side of the valve 486 thus moving it to its other position with the result that fluid from the pipe 484 can flow through the pipe 270 to the chamber 243 thus moving the upper platen 26 forward. Fluid exhausts from the chamber 243 through the pipe 272 and valve 486 to the reservoir. As soon as the shaft 184 begins to turn, two cams 500, 502 (FIG. 5), one at each end turn with it. Each cam is keyed to the shaft by a key 501 in the slot which accommodates the key 186 and is notched on its periphery at 504 (FIG. 4). On each cam rests a lever 506 pivoted to the framework 178 at 508 (FIGS. 4 and 7). At the opposite end of each of the levers from the pivot rests an upright rod, one, 510, thus being associated with the cam 500 and the other, 512, being associated with the cam 502. The rods 510, 512 are slidable vertically in bearings in the framework 178 and on being pushed upwardly actuate switches 514, 516 respectively. The switch 516 is normally open, i.e. is open when, as depicted in FIG. 4, a projection on the lever 506 rests in the notch in the periphery of the cam 502. It does this when the upper platen 26 is in its rearmost position on the beam 28. As soon as the cam begins to turn, the projection on the lever is forced out of the notch, the lever is lifted and the rod pushed upwardly to close the switch 516 (see also FIG. 14). The switch 514 is a two-way switch, and operated in a similar manner by the cam 500, is caused to move from the position depicted in FIG. 14 to its other position when the platen reaches its foremost position on the beam.

As soon, therefore, as the platen 26 moves from its rearward position in an operating cycle of the illustrative press, the switch 516 (FIG. 14) is closed and a relay H/4 energized. Energizing of this relay closes contacts H1, H2, H3 and H4, the closing of H2 being effective to ensure that if the now open contact 464b were to be closed again by the operator's releasing the plate 466 while the beam is coming forward, the solenoid V1A would be instantly energized to move the valve 492 to the right (as depicted in FIG. 13) thus causing fluid to flow to the left of valve 486 which would reverse the movement of the beam. (The solenoid V1B would have been de-energized by the opening of the contact 464a on release of the plate 466.)

Along the length of the front of the platen 26 of the illustrative press is a bar 520 (FIGS. 1 and 4) pivoted on bearing pins 522 supported by pins in the brackets 216 that support the rollers 214, the bar 520 being positioned so that if it comes up against any obstruction as the platen moves forward, it swings on its pivots and pushes back a bar 524 (FIG. 4) slidable on the framework 178 and suspended at its forward end by a tension spring 526. The rear end portion of the bar 524 has a cam face 528 which, when the bar is pushed back, lifts a vertical rod 530 and closes a switch 532 mounted on the bridge 202. The closing of the switch 532, (referring now to FIG. 14), ensures that if at any time after the contact H4 has been closed (i.e. the beam has started to move forward) the bar 520 meets an obstruction, a relay B/4 will be energized and contacts B1, B2, B3 and B4 closed. Contact B3 keeps the relay B/4 energized until the beam is restored to its rearward position even though the obstruction is removed. Contact H3 being closed, the closing of contact B2 energizes a relay A/2 (assuming the operator is still holding down the plate 466 and thus keeping contact 464a closed), which will be kept closed by contact A2 and which opens contact A1 thus deenergizing the solenoid V1B. The closing of contact B1 energizes the solenoid V1A and the platen moves back.

Assuming, however, that no obstruction engages the bar 520 during the platen's forward travel in the operation of the illustrative press, when the platen reaches its forward position, the bar 520 engages a stop 534 on the left-hand side wall 30 of the beam 28. At the same time, the switch 514 moves to its other position (from that depicted in FIG. 14), so the closing of contact B1 is not effective to energize the solenoid V1A. The result of the closing of contact B4, however, with the changing of switch 514, energizes a spring-return solenoid valve V2 (FIG. 13) which causes fluid from the high-pressure pump 452 to flow through a pipe 540 to the cylinders 54 above the pistons thus bringing down the beam 28. Pressure in the pipe 540 opens a pilot valve 542 allowing fluid from the low-pressure pump to join the flow to the cylinders 54 through a stop valve 544 and a non-return valve 546. Meanwhile, fluid from below the pistons in the cylinders 54 exhausts through a pressure relief valve 548 which maintains approximately sufficient pressure to support the weight of the beam and platen. The closing of contact B4 also energizes a relay B/2 with the result that contact D1 closes and keeps the solenoid V1B energized. A contact D2 opens so that the solenoid V1A will not now be energized to move the platen back though the plate 466 or the actuated one of the buttons 480, 482 be released by the operator.

As the beam 28 descends in the operation of the illustrative press, the cam bar 116 slides to the left (as viewed in FIG. 1), allowing the microswitch 142 to close as the beam leaves its uppermost positon, and actuating the microswitch 136 when it reaches the lowermost position to which it has been set to go. The closing of microswitch 142 closes a spring return solenoid valve V3 which has been open to allow fluid from the pump 452 to re-circulate to the reservoir through the valve V2, the solenoid valve V5 and a relief valve 550. When the beam approaches its lowermost position, the shaft 129 is rocked to actuate the microswitch 136; an arm 552 on a rearward projection of this shaft is arranged shortly before the beam reaches its lowermost position, to close the stop valve 544 thereby slowing down the beam over the last, say one third of an inch of its travel, due to the flow of fluid from the high capacity, low pressure pump 450 being cut off. The microswitch 136 is a two-way switch which, on actuation when the beam descends, moves from its position shown in FIG. 14 to cause a relay C/3 to be energized and the valve V2 de-energized to reverse the movement of the beam. The same result can be effected, as a safety precaution, by a two-way pressure-operated switch 554 associated with the pipe 540 and set at a predetermined safe limit of pressure if such pressure is exceeded. Energizing of the relay C/3 closes contacts C1 and C3 and opens contact C2, the closing of contact C1 holding the relay C/3 energized and thus the contact C2 open and thereby ensuring that the valve V2 remains energized independently of the switches 136 and 554. On de-energizing the valve V2, fluid is admitted to the cylinder 54 below the pistons and exhausted from thereabove, sufficient pressure also being built up in a pilot line 556 to cause the valve 542 to be moved to the right (as depicted in FIG. 13) so that fluid from the low pressure pump does not flow to the cylinders after the stop valve 544 has reopened.

The closing of the contact C3 in a cycle of operation of the illustrative press energizes an adjustable time-delay relay F/2 thereby closing (after a short predetermined time) a contact F1 which energizes the solenoid V1A causing the upper platen to start its rearward movement. The time-delay relay F/2 is so set as to ensure that the beam lifts the platen off the work before the platen starts to move back, but to allow the platen to move back while the beam is still rising. Simultaneously with the closing of the contact F1, a contact F2 opens to de-energize the solenoid V1B.

As the platen 26 leaves its foremost position on the beam 28 in the operation of the illustrative press, the switch 532 opens (but the relay B/4 is held energized by its contact B3) and the switch 514 moves back to the position depicted in FIG. 14. As the beam 28 rises from its lowermost position, the switch 136 is returned to the position depicted in FIG. 13, but the valve V2 remains de-energized due to the still open contact C2. When the beam reaches its uppermost position, the switch 142 opens, de-energizing the valve V3 and allowing the fluid to recirculate to the reservoir. Sufficient resistance to its flow to the reservoir is imposed by the valve 550, however, to ensure that the beam is maintained in its uppermost position while the illustrative press is at rest.

When the platen 26 reaches its rearward position on the beam 28 the switch 516 reopens and thereby de-energizes the relay H/4. Now contacts H1, H2, H3 and H4 open, the last mentioned one de-energizing the relays B/4 and C/3, and consequently D/2 and F/2 and restoring the circuits to the condition depicted in FIG. 14. Should the operator not have released the plate 468, the solenoid A/2 will have remained energized, thus holding open the contact A1 so that the press cannot re-cycle.

If the actuated one of the buttons 480, 482 were to have been released by the operator during the forward movement of the platen 26, not only would the solenoid V1B have been de-energized, but also the solenoid V1A would have been energized (through a circuit including the contact H2) thus instantly reversing the movement of the platen.

A button switch 558 is provided in the electrical control of the illustrative press to energize a relay E/3 which closes a contact E1 that short circuits the switches 464, 480 and 481 to energize the solenoid V1B and allow the platen 26 to come forward. The relay R/4 is thereupon energized, and a contact E2 (of the relay E/3) is thereafter effective to keep the relay E/3 energized until the platen returns to its rearmost position; a third contact E3 of the relay E/3 opens to prevent the solenoid valve V2 being actuated. Thus the platen comes forward to rest at its foremost position and can be returned by pressing a switch button 560 which de-energizes the solenoid V1B and energizes the solenoid V1A (the contact H1 being now closed). It will be realized that the contact E2 is a two-way one which, after energizing the relay E/3, breaks the circuit through the contacts 464b, and 482b and 480b thus preventing actuation of the solenoid V1A when the platen moves forward. The arrangement just mentioned assists setting up of the press (e.g., the adjustment of the knob 159 and binding screw 166) with the platen in its foremost position.

The control circuit includes two contacts 562, 564 which are opened and closed respectively when the start button 456 is pressed. These contacts prevent any possibility of instantaneous initiation of a cycle of operation of the illustrative press on pressing the start button and thus afford a measure of safety.

Having thus described my invention, what I claim as new and desire to secure by Letters Patent of the United States is:

1. Apparatus for feeding a web of sheet material progressively toward a work station comprising, in combination, a bracket for supporting a web of sheet material, means for sensing a pull on said web toward said work station, and power operated means operative in response to the operation of the sensing means in sensing such a pull for gripping the web in the portion supported by said bracket and advancing it toward the work station.

2. Apparatus for feeding a web of sheet material progressively to a work support comprising, in combination, means disposable adjacent said support for supporting a portion of a web of sheet material being fed from rolls to said work support, means carried by said portion-supporting means for sensing a pull on the web toward said work support, and power operated means operative in response to operation of the sensing means in sensing a pull on the web by the operator for gripping the web adjacent the web supporting means and feeding the web toward the work support.

3. In a die cutting press, in combination, a lower platen for supporting a cutting block, an upper platen moveable toward and away from the lower platen for pressing dies through sheet material supported on a cutting block thereon, means located adjacent the lower platen for supporting sheet material in such disposition that the operator can grasp it and draw it forward over the cutting block, and power operated means actuatable in response to the operator's pulling on the sheet material on said supporting means for gripping the sheet material rearwardly of the platen and advancing it toward the platen.

4. A die cutting press, in combination, an upper platen, a lower platen, a cutting block carried by the lower platen, means for supporting the upper platen for movement toward and away from the lower platen for pressing dies through sheet material supported on the cutting block, a bracket disposed rearwardly of the cutting block for supporting a portion of the sheet material being fed toward the cutting block, a bar disposed horizontally to overlie said supported portion in transverse relation thereto behind the cutting area, the bar being mounted for vertical bodily movement, and power operated means actuated in response to the raising of said bar by the operator in pulling on said sheet material for gripping said material rearwardly of the cutting block and advancing it toward the cutting block.

References Cited by the Examiner
UNITED STATES PATENTS

| | | | |
|---|---|---|---|
| 1,194,268 | 8/1916 | Bauchwitz | 83—563 |
| 2,003,364 | 6/1935 | Irmscher | 83—277 |
| 2,168,415 | 8/1939 | Lankhuff | 83—277 |
| 2,757,731 | 8/1956 | Musly | 83—527 |
| 2,792,061 | 5/1957 | Maiocchi | 83—527 |
| 3,081,660 | 3/1963 | Parrish et al. | 83—563 |

WILLIAM W. DYER, Jr., *Primary Examiner.*

L. B. TAYLOR, *Assistant Examiner.*